United States Patent
Backholm et al.

(10) Patent No.: US 8,285,200 B2
(45) Date of Patent: Oct. 9, 2012

(54) MAINTAINING AN IP CONNECTION IN A MOBILE NETWORK

(75) Inventors: Ari Backholm, Los Altos, CA (US); Seppo Salorinne, Helsinki (FI); Jukka Ahonen, Espoo (FI); Mikko Daavittila, Helsinki (FI); Andrew Everitt, Cambridge (GB); Lauri Vuornos, San Francisco, CA (US)

(73) Assignee: Seven Networks International Oy, Helsinki (FI)

( * ) Notice: Subject to any disclaimer, the term of this patent is extended or adjusted under 35 U.S.C. 154(b) by 0 days.

(21) Appl. No.: 12/853,119

(22) Filed: Aug. 9, 2010

(65) Prior Publication Data

US 2011/0051610 A1    Mar. 3, 2011

Related U.S. Application Data

(63) Continuation of application No. 11/471,630, filed on Jun. 21, 2006, now Pat. No. 7,774,007.

(60) Provisional application No. 60/707,170, filed on Aug. 11, 2005.

(30) Foreign Application Priority Data

Jun. 21, 2005    (FI) .................................... 20055333

(51) Int. Cl.
*H04W 72/00*    (2009.01)
(52) U.S. Cl. ......................................... 455/9; 370/395.2
(58) Field of Classification Search .................. 455/466, 455/9; 370/344

See application file for complete search history.

(56) References Cited

U.S. PATENT DOCUMENTS

| | | | |
|---|---|---|---|
| 4,831,582 A | 5/1989 | Miller et al. |
| 4,875,159 A | 10/1989 | Cary et al. |
| 4,897,781 A | 1/1990 | Chang et al. |
| 5,263,157 A | 11/1993 | Janis |
| 5,386,564 A | 1/1995 | Shearer et al. |
| 5,392,390 A | 2/1995 | Crozier |
| 5,572,643 A | 11/1996 | Judson |
| 5,581,749 A | 12/1996 | Hossain et al. |

(Continued)

FOREIGN PATENT DOCUMENTS

EP    1107519 A2    6/2001

(Continued)

OTHER PUBLICATIONS

International Application No. PCT/FI2006/050271, International Search Report, 4 pages, Sep. 25, 2006.

(Continued)

*Primary Examiner* — Marcos Batista
(74) *Attorney, Agent, or Firm* — Perkins Coie LLP

(57) ABSTRACT

A method for IP [=Internet Protocol] communication between a mobile terminal and its correspondent node in a mobile radio network. The method comprises establishing (2-2) an IP connection between the mobile terminal and its correspondent node. After detecting a period of inactivity in the IP connection, (2-4) keep-alive messages are sent via the IP connection at predetermined intervals, which are varied. The method comprises monitoring (2-6) the lengths of several periods of inactivity at which the mobile radio network disconnects the IP connection. Based on the monitored lengths of periods of inactivity, a maximum interval ($T_{INT}$) between keep-alive messages is determined (2-8) such that the maximum interval meets a predetermined criterion of statistical confidence, and the interval between keep-alive messages is set (2-1) to the maximum interval ($T_{INT}$).

23 Claims, 2 Drawing Sheets

U.S. PATENT DOCUMENTS

| | | |
|---|---|---|
| 5,600,834 A | 2/1997 | Howard |
| 5,613,012 A | 3/1997 | Hoffman et al. |
| 5,623,601 A | 4/1997 | Vu |
| 5,627,658 A | 5/1997 | Connors et al. |
| 5,630,081 A | 5/1997 | Rybicki et al. |
| 5,634,053 A | 5/1997 | Noble et al. |
| 5,647,002 A | 7/1997 | Brunson |
| 5,652,884 A | 7/1997 | Palevich |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,701,423 A | 12/1997 | Crozier |
| 5,704,029 A | 12/1997 | Wright, Jr. |
| 5,706,502 A | 1/1998 | Foley et al. |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,735 A | 3/1998 | Meyering |
| 5,745,360 A | 4/1998 | Leone et al. |
| 5,752,246 A | 5/1998 | Rogers et al. |
| 5,757,916 A | 5/1998 | MacDoran et al. |
| 5,758,150 A | 5/1998 | Bell et al. |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,787,441 A | 7/1998 | Beckhardt |
| 5,790,425 A | 8/1998 | Wagle |
| 5,790,790 A | 8/1998 | Smith et al. |
| 5,799,318 A | 8/1998 | Cardinal et al. |
| 5,832,483 A | 11/1998 | Barker |
| 5,857,201 A | 1/1999 | Wright, Jr. et al. |
| 5,870,759 A | 2/1999 | Bauer et al. |
| 5,881,055 A * | 3/1999 | Kondo .................. 370/311 |
| 5,909,689 A | 6/1999 | Van Ryzin |
| 5,943,676 A | 8/1999 | Boothby |
| 5,961,590 A | 10/1999 | Mendez et al. |
| 5,968,131 A | 10/1999 | Mendez et al. |
| 5,978,933 A | 11/1999 | Wyld et al. |
| 6,006,259 A | 12/1999 | Adelman et al. |
| 6,006,274 A | 12/1999 | Hawkins et al. |
| 6,023,708 A | 2/2000 | Mendez et al. |
| 6,044,381 A | 3/2000 | Boothby et al. |
| 6,085,192 A | 7/2000 | Mendez et al. |
| 6,131,096 A | 10/2000 | Ng et al. |
| 6,131,116 A | 10/2000 | Riggins et al. |
| 6,138,124 A | 10/2000 | Beckhardt |
| 6,141,664 A | 10/2000 | Boothby |
| 6,151,606 A | 11/2000 | Mendez |
| 6,173,312 B1 | 1/2001 | Atarashi et al. |
| 6,212,175 B1 | 4/2001 | Harsch |
| 6,212,529 B1 | 4/2001 | Boothby et al. |
| 6,223,187 B1 | 4/2001 | Boothby et al. |
| 6,233,341 B1 | 5/2001 | Riggins |
| 6,324,542 B1 | 11/2001 | Wright, Jr. et al. |
| 6,708,221 B1 | 3/2004 | Mendez et al. |
| 6,799,190 B1 | 9/2004 | Boothby |
| 6,925,477 B1 | 8/2005 | Champagne et al. |
| 7,139,565 B2 | 11/2006 | Fiatal et al. |
| 7,430,609 B2 | 9/2008 | Brown et al. |
| 7,634,558 B1 * | 12/2009 | Mangal et al. ............ 709/224 |
| 7,774,007 B2 | 8/2010 | Backholm et al. |
| 7,904,101 B2 | 3/2011 | Backholm |
| 2003/0128676 A1 | 7/2003 | Lee |
| 2004/0120294 A1 | 6/2004 | Yang et al. |
| 2004/0176128 A1 | 9/2004 | Grabelsky et al. |
| 2004/0202117 A1 * | 10/2004 | Wilson et al. ............ 370/310 |
| 2004/0230619 A1 | 11/2004 | Blanco et al. |
| 2005/0015432 A1 | 1/2005 | Cohen |
| 2005/0086540 A1 | 4/2005 | Gunter et al. |
| 2005/0188098 A1 * | 8/2005 | Dunk .................. 709/232 |
| 2005/0278641 A1 | 12/2005 | Mansour et al. |
| 2006/0026649 A1 | 2/2006 | Shieh |
| 2006/0048061 A1 | 3/2006 | Forlenza et al. |
| 2006/0063544 A1 | 3/2006 | Zhao et al. |
| 2006/0123119 A1 * | 6/2006 | Hill et al. .................. 709/227 |
| 2007/0019610 A1 | 1/2007 | Backholm et al. |
| 2007/0019611 A1 | 1/2007 | Backholm |
| 2011/0047232 A1 | 2/2011 | Backholm |
| 2012/0008536 A1 | 1/2012 | Tervahauta et al. |

FOREIGN PATENT DOCUMENTS

| | | |
|---|---|---|
| EP | 1361765 A1 | 11/2003 |
| EP | 1569404 A1 | 8/2005 |
| FL | 118451 B | 11/2007 |
| FL | 119138 B | 7/2008 |
| WO | WO 98/24257 A1 | 6/1998 |
| WO | WO 00/78068 A1 | 12/2000 |
| WO | WO 03/067447 A1 | 8/2003 |
| WO | WO 03/098890 A1 | 11/2003 |
| WO | WO 2004/043092 A1 | 5/2004 |
| WO | WO 2004/045171 A1 | 5/2004 |
| WO | WO 2005/024569 A2 | 3/2005 |
| WO | WO 2006/136660 A1 | 12/2006 |
| WO | WO 2006/136661 A1 | 12/2006 |

OTHER PUBLICATIONS

International Application No. PCT/FI2006/050272, International Search Report, 3 pages, Sep. 21, 2006.

Allchin, James Edward, "An Architecture for Reliable Decentralized Systems," Ph.D. Thesis, Georgia Institute of Technology, 185 pages, Sep. 1983.

Augun, Audrey, "Integrating Lotus Notes With Enterprise Data," Lotus Notes Advisory, pp. 22-25, Jul.-Aug. 1996.

Balaban, Bob, "This Is Not Your Fathers Basic: LotusScript in Notes Release 4," The View, vol. 1, Issue 5, 32 pages, Nov.-Dec. 1995.

Blaney, Jeff, "You Can Take It With You—An Introduction to Mobile Computing With Notes R4," The View, vol. 2, Issue 1, 14 pages, Jan.-Feb. 1996.

Braden, R., "Requirements for Internet Hosts—Communication Layers," RFC 1122, Internet Engineering Task Force, 107 pages, Oct. 1989.

Brown, Kevin et al., "Mastering Lotus Notes®," Sybex Inc., 996 pages, 1995.

"Chapter: About NotesPump," Publication Unknown, 480 pages, Date Unknown.

"Chapter 13-1—Anatomy of a Note ID," Publication Unknown, 8 pages, Date Unknown.

Cole, Barb et al., "Lotus Airs Notes-To-Database Integration Tool," Network World, 2 pages, Oct. 2, 1995.

Dahl, Andrew, "Lotus Notes® 4 Administrators Survival Guide," Sams Publishing, 64 pages, 1996.

Falkner, Mike, "How to Plan, Develop, and Implement Lotus Notes® In Your Organization," John Wiley & Sons, Inc., 539 pages, 1996.

Freeland, Pat et al., "Lotus Notes 3-3.1 for Dummies™," IDG Books Worldwide, 389 pages, 1994.

Frenkel, Garry, "Pumping for Info: Notes and Database Integration," Network Computing, 10 pages, May 1, 1996.

Gewirtz, David, "Lotus Notes 3 Revealed!," Prima Publishing, 261 pages, 1994.

Grous, Paul J., "Creating and Managing a Web Site With Lotus Internotes Web Publisher," The View, vol. 1, Issue 4, 20 pages, Sep.-Oct. 1995.

Hajdu, Kalman et al., "Lotus Notes Release 4 In A Multiplatform Environment," IBM Corporation, 173 pages, Feb. 1996.

IBM Corporation, "The Architecture of Lotus Notes," White Paper No. 114654, 26 pages, May 31, 1995.

IBM Corporation, "The History of Notes and Domino," Lotus Developer Domain, 11 pages, Sep. 29, 2003.

IntelliLink Corporation, "IntelliLink® for Windows User's Guide," Version 3.0, 167 pages, 1994.

Kornblith, Polly Russell, "Lotus Notes Answers: Certified Tech Support," Covers Release 3, McGraw-Hill, Inc., 326 pages, 1994.

Kreisle, Bill, "Teach Yourself . . . Lotus Notes 4," MIS Press, 464 pages, 1996.

Lamb, John P. et al., "Lotus Notes Network Design," McGraw-Hill, 278 pages, 1996.

Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrator's Guide—Server for NetWare, OS-2, and Unix," Release 3.1, 509 pages, 1994.
Lotus Development Corporation, "Lotus Notes Administrator's Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Date Unknown.
Lotus Development Corporation, "Lotus Notes Customer Support Guide—North American Guide," Release 4.1, 51 pages, Date Unknown.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrators Guide," Release 4, 60 pages, 1995.
Lotus Development Corporation, "Lotus Notes Internotes Web Navigator Users Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Date Unknown.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference for Application Developers," Release 3, 6 pages, Date Unknown.
Lotus Development Corporation, "Lotus Notes Quick Reference for Macintosh," Release 3, 6 pages, Date Unknown.
Lotus Development Corporation, "Lotus Notes Quick Reference for SmartIcons," Release 3.1, 4 pages, Date Unknown.
Lotus Development Corporation, "Lotus Notes Quick Reference for Windows and Presentation Manager," Release 3, 6 pages, Date Unknown.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Date Unknown.
Lotus Development Corporation, "What Is the Notes Replicator?," Lotus Notes Knowledge Base, 8 pages, Jul. 5, 1995.
"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes—Notes Administration Help," Screen Shots, 17 pages, Date Unknown.
Marmel, Elaine, "Easy Lotus® Notes Release 4.0," Que Corporation, 237 pages, 1996.
McMullen, Melanie, "Network Remote Access and Mobile Computing," Miller Freeman Inc., 226 pages, 1994.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.
"NotesPump 1.0 Release Notes," Publication Unknown, 8 pages, Date Unknown.
Opyt, Barbara et al., "Use the Internet As Your Lotus Notes WAN," Lotus Notes Advisor, pp. 17-20, Nov.-Dec. 1996.
"Overview—What Is Lotus NotesPump?," Publication Unknown, 88 pages, Date Unknown.

Pyle, Hugh, "The Architecture of Lotus Notes," Lotus Notes Advisor, Premiere Issue, pp. 18-27, 1995.

Pyle, Lisa, "A Jump Start to the Top Ten R3-To-R4 Migration Considerations," The View, vol. 1, Issue 5, 22 pages, Nov.-Dec. 1995.

Shafran, Andrew Bryce, "Easy Lotus Notes® for Windows™," Que Corporation, 199 pages, 1994.

Swedeen, Bret et al., "Under the Microscope—Domino Replication," LDD Today, 8 pages, Oct. 1, 1998.

Tamura, Randall A., "Lotus® Notes ™ 4 Unleashed," Sams Publishing, 928 pages, 1996.

U.S. Appl. No. 11/296,255, Non-Final Office Action, 10 pages, Jan. 12, 2010.

U.S. Appl. No. 11/318,487, Final Office Action, 15 pages, Nov. 10, 2009.

Wainwright, Andrew, "Secrets to Running Lotus Notes: The Decisions No One Tells You How to Make," IBM Corporation, 193 pages, Oct. 1996.

Wilcox, Adam A., "PC Learning Labs Teaches Lotus Notes 3.0," Ziff-Davis Press, 381 pages, 1993.

Wong, Harry, "Casahl's Replic-Action: Delivering True Notes-DBMS Integration," The View, vol. 2, Issue 1, pp. 33-50, Jan.-Feb. 1996.

* cited by examiner

MAINTAINING AN IP CONNECTION IN A MOBILE NETWORK

BACKGROUND OF THE INVENTION

The invention relates to techniques for maintaining an IP (Internet protocol) connection in a mobile network.

In a packet-switched mobile network, a mobile terminal is not normally assigned a dedicated circuit-switched connection. Instead, the network establishes and maintains a session for the terminal, and data packets are sent when necessary. In order to integrate mobile terminals with office applications, it is becoming increasingly popular to maintain Internet Protocol (IP) connections over packet data channels in packet-switched mobile networks. Maintaining an IP connection to/from a mobile terminal is desirable in order to keep data banks synchronized between the mobile terminal and an office computer, for example.

Maintaining an IP connection in packet-switched mobile networks involves certain problems. For example, it consumes the mobile terminal's battery. Further, many networks apply operator-defined policies to break connections after a certain period of inactivity. This period can be quite short, such as five minutes. When the IP connection to/from the mobile terminal is disconnected, database synchronization is impossible before connection re-establishment. Connection re-establishment must be initiated from the mobile terminal's side, the network cannot initiate connection re-establishment.

But connection re-establishment involves further expenses in tariff and/or battery consumption. Yet further, since the network cannot initiate re-establishment of the IP connection, network-initiated data synchronization must be initiated by means of an out-band trigger, ie, signalling independent from the Internet Protocol. A short message service (SMS) and its derivatives are examples of theoretically suitable out-band triggering mechanisms. But a single GSM-compliant short message can only transfer approximately 160 characters, which means that it is impracticable to transfer actual data in the trigger message. This has the consequence that the subscriber must bear the expenses and delays in re-establishing the IP connection.

The mobile terminal can send keep-alive messages in order to prevent the network from disconnecting a temporarily inactive IP connection. A keep-alive message is a message sent for the purpose of preventing the network from disconnecting the IP connection.

The mobile terminal's operating parameters in respect of the keep-alive messages could be optimized for a single network, but connection break-up habits vary between networks and in a single network they may depend on roaming arrangements between operators.

BRIEF DESCRIPTION OF THE INVENTION

An object of the present invention is to provide a method, equipment and a computer program product to so as to alleviate the above disadvantages relating to connection break-up in packet-switched mobile radio networks. The object of the invention is achieved by the methods and equipment which are characterized by what is stated in the independent claims. The dependent claims relate to specific embodiments of the invention.

The invention is based on the following idea. An IP connection is established between the mobile terminal and its correspondent node. During periods of inactivity in the IP connection, keep-alive messages are sent at a predetermined schedule. Keep-alive messages can be quite short, such as 10 bytes, but they prevent the network from detecting the connection as inactive, whereby it is not disconnected. The keep-alive schedule is varied. At least one of the parties monitors the lengths of several periods of inactivity at which the mobile radio network disconnects the IP connection. Based on several monitored lengths of periods of inactivity, a maximum interval between keep-alive messages is determined such that the maximum interval meets some predetermined criterion of statistical confidence. In other words, spurious connection break-ups, which are not avoidable by keep-alive messages, are ignored. The interval between keep-alive messages is set to the determined maximum interval.

An aspect of the invention is a method according to claim 1. Other aspects of the invention relate to computer systems or program products for implementing the above methods.

BRIEF DESCRIPTION OF THE DRAWINGS

In the following the invention will be described in greater detail by means of specific embodiments with reference to the attached drawings, in which.

DETAILED DESCRIPTION OF SPECIFIC EMBODIMENTS

The invention is applicable to virtually any mobile network architecture. The mobile network may be based on GPRS, 1xRTT or EVDO technologies, for example. The invention can also be implemented as part of a push-type mobile e-mail system, particularly in a consumer e-mail system, in which optimization of network resources is important because of the large number of users.

Figure 1:
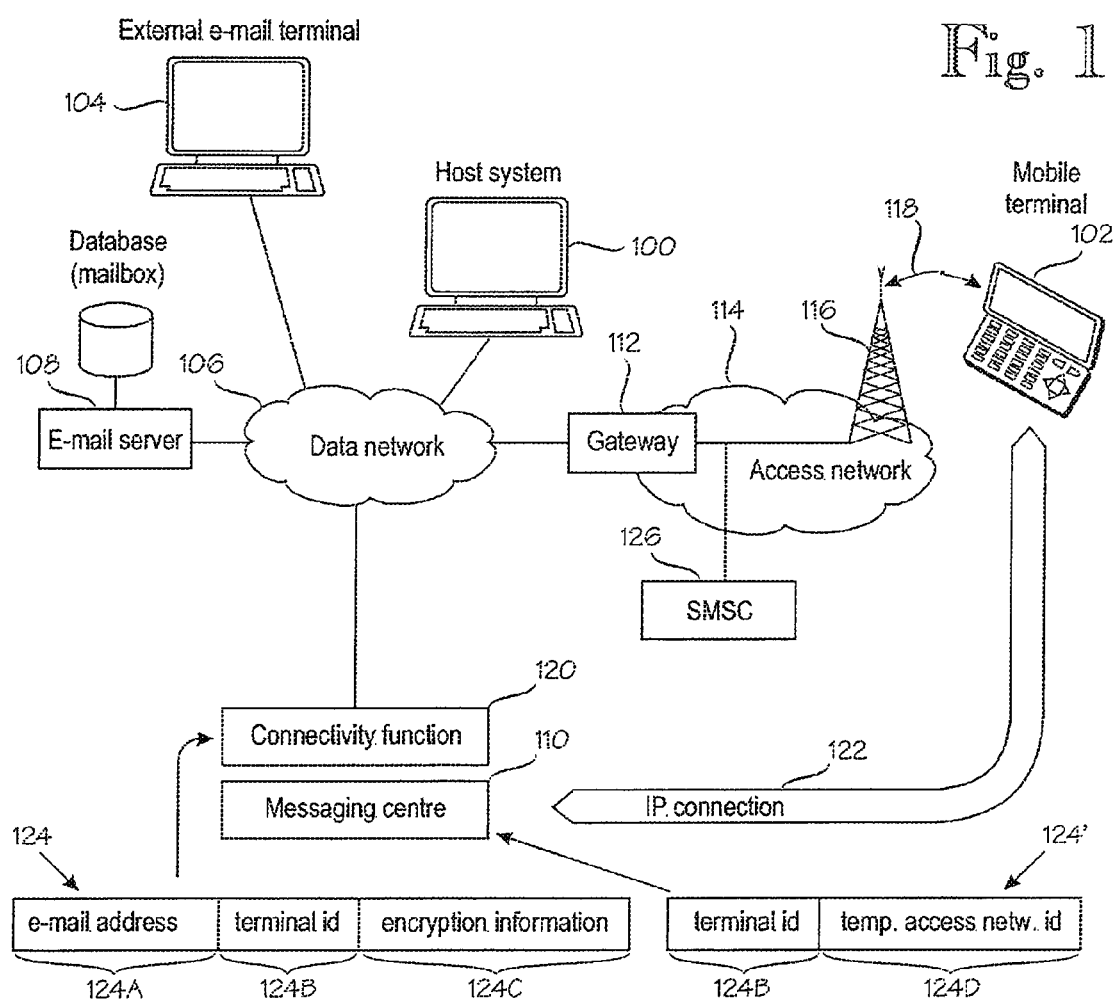
FIG. 1 shows an exemplary network arrangement in which the invention can be used.

FIG. 1 shows an exemplary system architecture which is supported by the owner of the present application. This system supports synchronization of e-mail messages and/or calendar items and/or other information between a host system and a mobile terminal.

Reference numeral 100 denotes a host system that is able to send an receive e-mail messages. Reference numeral 102 denotes a mobile terminal, also able to send an receive e-mail messages. The e-mail messages may originate or terminate at external e-mail terminals, one of which is denoted by reference numeral 104. The invention aims at improving cooperation between the host system 100 and mobile terminal 102 such that they can use a single e-mail account as transparently as possible. This means, for example, that the users of the external e-mail terminals 104, when sending or receiving e-mail, do not need to know if the user of the host system 100 actually uses the host system 100 or the mobile terminal 102 to communicate via e-mail. The transparency also means that e-mail manipulation at the mobile terminal 102 has, as far as possible, the same effect as the corresponding e-mail manipulation at the host system 100. For example, e-mail messages read at the mobile terminal 102 should preferably be marked as read at the host system.

Reference numeral 106 denotes a data network, such as an IP (Internet Protocol) network, which may be the common Internet or its closed subnetworks, commonly called intranets or extranets. Reference numeral 108 denotes an e-mail server and its associated database. There may be separate e-mail servers and/or server addresses for incoming and outgoing e-mail. The database stores an e-mail account, addressable by means of an e-mail address, that appears as a mailbox to the owner of the e-mail account. In order to communicate with mobile terminals 102, the data network 106 is connected, via a gateway 112 to an access network 114. The access network comprises a set of base stations 116 to provide wireless coverage over a wireless interface 118 to the mobile terminals 102.

Reference numeral 110 denotes a messaging centre that is largely responsible for providing the above-mentioned transparency between the host system 100 and the mobile terminal 102. The system architecture also comprises a connectivity function 120, whose task is to push e-mail messages to the mobile terminal. In the embodiment shown in FIG. 1, the connectivity function 120 is considered a physically integral but logically distinct element of the messaging centre 110.

The mobile terminal 102 may be a pocket or laptop computer with a radio interface, a smart cellular telephone, or the like. Depending on implementation, the host system 100, if present, may have different roles. In some implementations the host system 100 is optional and may be a conventional office computer that merely acts as the mobile terminal user's principal computer and e-mail terminal. In other implementations the host system may act as a platform for a single user's connectivity function, in addition to being an office computer. In yet other implementations the host system 100 may comprise the connectivity function for several users. Thus it is a server instead of a normal office computer.

We assume here that the access network 114 is able to establish and maintain a IP connection 122 between the messaging centre 110 and the mobile terminal 102.

FIG. 1 shows an embodiment in which the messaging centre 110 is largely responsible for e-mail transport to/from the mobile terminal 102 via the access network 114, while a separate connectivity function 120 is responsible for data security issues. The connectivity function 120 may be physically attached to or co-located with the messaging centre 110, but they are logically separate elements. Indeed, a definite advantage of the separate connectivity function 120 is that it can be detached from the messaging centre, for instance, within the company that owns the host system 100 or the e-mail server 108. For a small number of users, the connectivity function 120 can be installed in each host system 100, or the host system 100 can be interpreted as a separate server configured to support multiple users. It is even possible to implement some or all the above-mentioned options. This means, for example, that there is one or more messaging centres 110 that offer services to several network operators, or they may be a dedicated messaging centre for each network operator (somewhat analogous to short messaging centres). Each messaging centre 110 may have an integral connectivity function 120 to support users who don't wish to install a separate connectivity function in a host system 100. For users who do install a separate connectivity function 120 in their host systems 100, such connectivity functions bypass the connectivity function in the messaging centre 110 and address the messaging centre 110 directly.

A real e-mail system supports a large number of mobile terminals 102 and IP connections 122. In order to keep track of which e-mail account and which IP connection belongs to which mobile terminal, the messaging centre 110 and the connectivity function collectively maintain an association 124, 124' for each supported mobile terminal. Basically, each association 124, 124' joins three fields, namely an e-mail address 124A assigned to the mobile terminal or its user, encryption information 124C and a temporary wireless identity 124D of the mobile terminal in the access network. The embodiment shown in FIG. 1 also employs a terminal identifier 124B which may be the same as the e-mail address 124A of the mobile terminal 102, in which case the association 124 actually associates three information items. Alternatively, the terminal identifier 124B may be an identifier arbitrarily assigned to the mobile terminal. In a preferred implementation the terminal identifier 124B is the mobile terminal's equipment identifier or its derivative. The encryption information 124C is preferably related to the mobile terminal's equipment identity and is preferably generated by the mobile terminal itself, so as to ensure that no other terminal besides the one used for creating the encryption information 124C will be able to decrypt incoming encrypted e-mail messages. The temporary wireless identity 124D may be the identifier of the IP connection 122 to the mobile station.

In the above-described system, the messaging centre 110 and connectivity function 120 were arranged to support a fairly large number of users of e-mail and/or calendar data. In order to satisfy the needs of the present invention, virtually any communication server able to maintain an IP connection to the mobile terminal can be used.

Figure 2:
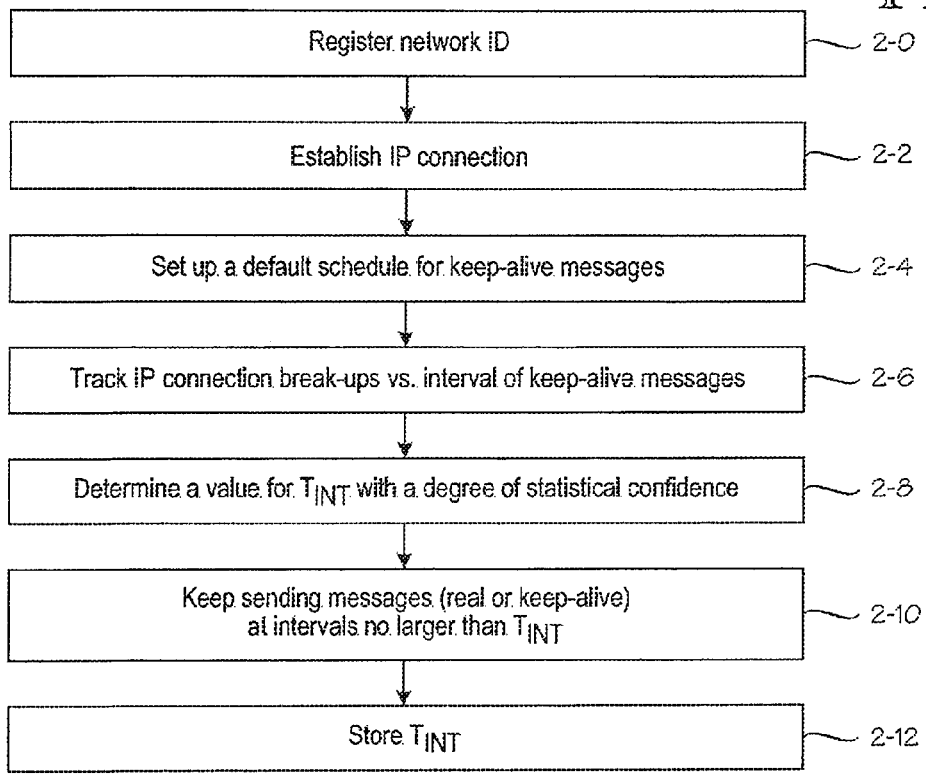
FIG. 2 shows a flowchart illustrating an embodiment of the invention.

FIG. 2 shows a flowchart illustrating an embodiment of the invention. In an optional step 2-0 the network identifier is registered, which means that the method steps should be performed and the resulting parameters maintained separately for each network. In step 2-2 an IP connection is established between the mobile terminal and its correspondent node. The connection establishment can be entirely conventional. Initially, in step 2-4, the mobile terminal and/or its correspondent node sends keep-alive messages when the IP connection is otherwise idle, ie, when there is no net user data to send. The keep-alive messages are sent according to a predetermined schedule. The schedule may be empty, which means that the mobile terminal may initially send no keep-alive messages at all. In step 2-6 the mobile terminal and/or its correspondent node keeps track of the periods of time after which the network disconnects the IP connection. The period of inactivity after which the network disconnects the IP connection will be called maximum inactivity period. A problem is that the mobile terminal does not know the true value of the maximum inactivity period; the network operator does not publish it. In an embodiment of the invention, the true value of the maximum inactivity period is approached from either direction (upwards and downwards) by altering the schedule for transmitting the keep-alive messages. On the other hand, it is not economically feasible to simply accept the shorted inactivity period before connection break-up as the value of the maximum inactivity period, because connection break-ups may occur for reasons which are not repeatable. In other words, many of the early connection break-ups occur regardless of the keep-alive messages, and attempting to eliminate such spurious break-ups by more frequent keep-alive messages will only result in increased battery drain and/or telecommunication tariffs.

Accordingly, step 2-8 comprises achieving a desired degree of statistical confidence in respect of the detected maximum inactivity period. In order to achieve statistical significance, the mobile terminal applies a confidence measure, such as variance. In a typical but non-restricting implementation, the mobile terminal may regard the connection break-up as regular if it happens after a certain inactivity period with a variance lower than some predetermined value. For example, the connection break-up may be considered regular if the network has discontinued the IP connection a predetermined minimum number x of times after an inactivity period of t, wherein the distribution of t has a variance var(t) which is smaller than some predetermined value y.

The act of achieving a desired degree of statistical confidence preferably comprises subtracting a safety margin Δt from the detected maximum inactivity period. For example, the safety margin may be expressed in minutes, such as 1-2 minutes, or as a percentage, such as 10-20%. If the detected maximum inactivity period is, say, 15 minutes, the mobile terminal may store a value of 13-14 minutes as a maximum safe interval between keep-alive messages. Let us denote this interval value by $T_{INT}$.

In step 2-10 the mobile terminal and/or its correspondent node set up a schedule for sending keep-alive messages at intervals no higher than $T_{INT}$ in absence of net user traffic. By sending keep-alive messages via an otherwise idle IP connection at intervals no higher than $T_{INT}$, the network regards the IP connection as active and, under normal operating conditions, does not disconnect it.

The keep-alive messages can be sent by either end of the connection, ie, by the mobile terminal and/or its correspondent node, such as a server, in the fixed part of the mobile radio network.

Sending the keep-alive messages at intervals no higher than $T_{INT}$ can be accomplished by means of a timer, which may be a physical timer or a logical one, such as a program thread or process. Each time any message is sent (either a real message or a keep-alive message), a timer with a value $T_{INT}$ is triggered. When the timer expires, a keep-alive message is sent, and the timer is re-triggered.

The optimum value for the safety margin safety margin Δt depends on the costs (battery-wise and tariff-wise) of sending keep-alive messages and re-establishing disconnected IP connections. It may also depend on the behaviour of the network, ie, the regularity by which it breaks up temporarily inactive connections. If the network's behaviour is poorly predictable, and break-ups occurs with a certain safety margin, the safety margin should be increased.

In a further optional step 2-12, the maximum safe interval between keep-alive messages, $T_{INT}$, is stored together with an identifier of the network in which the $T_{INT}$ was determined, whereby it can be quickly taken into use on re-entry to the same network. This value can be stored in the mobile terminal. Instead of storing the value in the mobile terminal, or in addition to it, the mobile terminal may send the value to its home network to be stored in a data base which can be inquired by mobile terminals which are about to begin roaming in a foreign network. The value stored by other mobile terminals in the data base in the home network may override any default value otherwise used by the roaming mobile terminal.

Instead of sending the keep-alive messages from the mobile terminal, or in addition to it, the keep-alive messages may be sent from a stationary server connected to the mobile radio network.

Figure 3A:
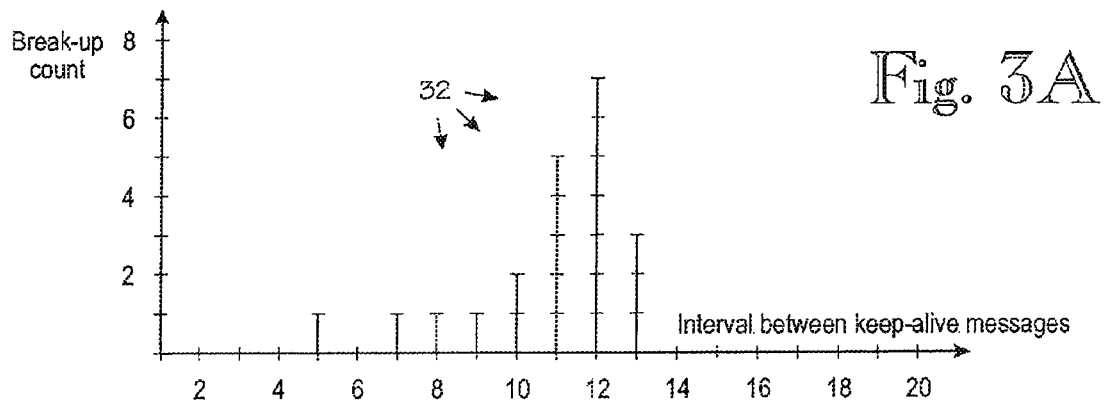
FIGS. 3A and 3B illustrate a technique for determining a maximum interval between keep-alive messages by means of a cumulative probability function.
Figure 3B:
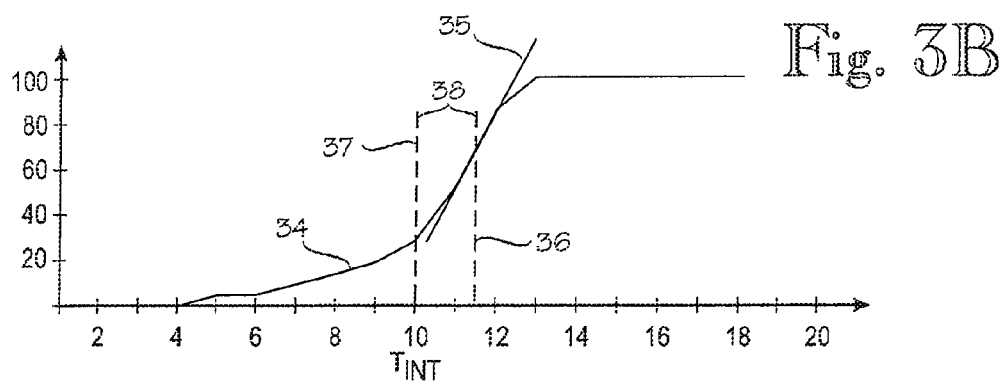

FIGS. 3A and 3B illustrate a technique for determining a maximum interval between keep-alive messages by means of a cumulative probability function. The vertical bars in FIG. 3A, collectively denoted by reference numeral 32, show counts of connection break-up versus interval between keep-alive messages. In this example, one break-up was detected at intervals of 5, 7, 8 and 9 minutes. Two break-ups were detected at an interval of 10 minutes, five at 11 minutes, seven at 12 minutes and, finally, three break-ups at an interval of 13 minutes. No idle connection survived for longer than 13 minutes.

Reference numeral 34 in FIG. 3B shows a cumulative probability function which illustrates a cumulative probability for the network breaking up an idle connection versus interval between keep-alive messages, given the monitoring data shown in FIG. 3A. As shown by function 34, all idle connection survived for 4 minutes and none survived for longer than 13 minutes. Reference numeral 35 denotes a line of maximum derivative in the cumulative probability function 34. It is reasonable to assume that the line of maximum derivative coincides with the maximum period of inactivity tolerated by the network. Or, if the cumulative probability function 34 is drawn as discrete steps (jumps), the position of line 35 can be determined by the highest jump in line 34.

This maximum period is denoted by reference numeral 36, and its value is approximately 11.5 minutes in this example. A value of 10 minutes for $T_{INT}$ is appropriate, as indicated by dashed line 37. Reference numeral 38 denotes a safety margin between the lines 36 and 37.

Although this example shows that as much as 30% of connections were disconnected after 10 minutes of inactivity, it is reasonable to assume that these disconnections were caused by spurious effects rather than the network's policy to break up idle connections.

It is readily apparent to a person skilled in the art that, as the technology advances, the inventive concept can be implemented in various ways. The invention and its embodiments are not limited to the examples described above but may vary within the scope of the claims.

The invention claimed is:

1. A method of maintaining a connection between a mobile terminal and a network element in a network, the method, comprising:
   exchanging keep alive messages between the mobile terminal and the network element over an Internet Protocol connection;
   altering a time interval between the keep alive messages exchanged between the mobile terminal and the network element;
   monitoring the Internet Protocol connection to determine if disconnection of the IP connection occurs as a result of the altering of the time interval between the keep alive messages;
   determining a value for the time interval, the value being determined such that the Internet Protocol connection with the network element is not disconnected and further determined based on an associated cost to send the keep-alive messages;
   wherein, the cost to send the keep-alive messages includes battery life of the mobile terminal;
   wherein, the time intervals are further determined based on a cumulative probability function for the disconnection of the IP connection as a function of the time interval; and
   setting the time interval to be the value.

2. The method of claim 1, further comprising re-establishing the Internet Protocol connection between the mobile terminal and the network element when the Internet Protocol connection is disconnected.

3. The method of claim 1, wherein exchanging the keep alive messages comprises sending the keep alive messages from the mobile device.

4. The method of claim 1, wherein exchanging the keep alive messages comprises sending the keep alive messages from the network element.

5. The method of claim 1, wherein, the value satisfies a statistical confidence; wherein the statistical confidence is a variance.

6. The method of claim 5, wherein the statistical confidence is based on a safety margin, and further, wherein the safety margin is based on one or more of:
- an amount of time subtracted from the value of the time interval;
- a percentage of the value of the time interval.

7. The method of claim 5, wherein the statistical confidence is based on a cumulative probability function for the disconnection of the Internet Protocol connection as a function of the time interval.

8. The method of claim 5, wherein altering the time interval comprises altering the time interval in both a predetermined and a variable manner.

9. The method of claim 1, further comprising storing the value for the time interval with an identifier of the network.

10. The method of claim 9, wherein the value for the time interval and the identified of the network are stored in the mobile device.

11. A network element operative to maintain a connection with a mobile terminal in a mobile network, the network element, comprising:
- an electronic processor programmed to execute a set of instructions;
- a data storage device coupled to the processor; and
- the set of instructions contained in the data storage device, wherein the set of instructions are executed by the processor, the network element maintains the connection between the mobile terminal and the network element by:
- sending keep alive messages from the network element over an Internet Protocol connection, the keep alive messages being arranged with successive keep alive messages being separated by a time interval;
- altering a time interval between the keep alive messages exchanged between the mobile terminal and the network element;
- monitoring the Internet Protocol connection to determine if disconnection of the IP connection occurs as a result of the altering of the time interval between the keep alive messages;
- determining a value for the time interval, the value being determined such that the Internet Protocol connection with the network element is not disconnected and further based on battery life of the mobile terminal and a battery consumption involved in re-establishing the IP connection;
- wherein, the time intervals are further determined based on a cumulative probability function for the disconnection of the IP connection as a function of the time interval.

12. The network element of claim 11, wherein, the value satisfies a criterion of statistical confidence.

13. The network element of claim 12, wherein the criterion of statistical confidence is based on a safety margin, and further, wherein the safety margin is based on one or more of:
- an amount of time subtracted from the maximum value of the time interval;
- a percentage of the maximum value of the time interval; or
- a cost associated with sending the keep alive messages.

14. The network element of claim 11, wherein the criterion of statistical confidence is based on a cumulative probability function for the disconnection of the Internet Protocol connection as a function of the time interval.

15. The network element of claim 1, wherein altering the time interval comprises altering the time interval in one or more of a predetermined and a variable manner.

16. A method of maintaining an IP connection between a mobile terminal and a network node over a network, comprising:
- sending, by the mobile terminal to the network node, keep-alive messages in an absence of network traffic through the IP connection between the mobile terminal and the network node;
- dynamically adjusting time intervals between the keep-alive messages sent by the mobile terminal;
- further optimizing the time intervals between the keep alive messages based on a cost to send the keep-alive messages in the network and based on whether the keep-alive messages are sent with adequate frequency to maintain the IP connection;
- wherein, the cost to send the keep-alive messages includes battery life of the mobile terminal;
- wherein, the time intervals are further determined based on a cumulative probability function for the disconnection of the IP connection as a function of the time interval.

17. The method of claim 16, wherein, the time intervals are adjusted according to statistical characteristics of the communication history across the IP connection.

18. The method of claim 16, wherein, the cost further includes the cost to re-establish the IP connection in the event of disconnection.

19. The method of claim 16, wherein, the cost further includes a battery consumption involved in re-establishing the IP connection.

20. A method of maintaining an IP connection between a mobile terminal and a network node over a network, comprising:
- sending keep-alive messages between the mobile terminal and the network node in an absence of network traffic through the IP connection between the mobile terminal and the network node;
- dynamically adjusting time intervals between the keep-alive messages sent across the IP connection between the mobile terminal and the network node;
- optimizing the time intervals between the keep alive messages based on battery life of the mobile terminal and further based on whether the keep-alive messages are sent with adequate frequency to maintain the IP connection;
- wherein, the time intervals are further determined based on a cumulative probability function for the disconnection of the IP connection as a function of the time interval.

21. The method of claim 20, wherein, the time intervals are adjusted dynamically based on network behavior,
- wherein, the network behavior includes a regularity with which the network breaks up inactive connections.

22. The method of claim 20, wherein, the keep-alive messages are sent from a server connected to the network.

23. The method of claim 20, wherein, the keep-alive messages are sent from the mobile device to the network node.

* * * * *